Patented Oct. 30, 1945

2,388,080

UNITED STATES PATENT OFFICE 2,388,080

ALUMINA AND SILICON CARBIDE REFRACTORY

Frank H. Riddle, Detroit, Mich., assignor to Champion Spark Plug Company, Toledo, Ohio, a corporation of Delaware No Drawing. Application June 29, 1940, Serial No. 343,265

5 Claims. (Cl. 106—44)

This invention relates to a refractory having high strength at high temperatures.

The purpose of the invention is to provide a readily made refractory which will have greater strength at high temperatures, especially from about cone 16 to 32, than previously known refractories which are now available for commercial use as saggers or the like.

In my prior patent on "Refractory material and batch and method for making the same," No. 1,942,879, issued January 9, 1934, there is a disclosure of an improved refractory material which has very high strength at high temperatures compared with most other refractories which are available. There have been other compositions used employing large amounts of alumina with various other materials and such alumina refractories have been comparatively useful for many purposes. Also, bonded silicon carbide has been employed in various ways for refractory purposes. It has been found that by mixing silicon carbide with alumina and properly bonding the material, a refractory can be produced which is much stronger than the well known alumina refractories or than even previously known silicon carbide refractories.

As one specific example, the following test illustrates the nature of the invention. A mixture of 15% silicon carbide ground to 80 mesh and finer, 74% alumina, also ground to 80 mesh or finer, and about 60% passing 325 mesh, 10% ball clay, and 1% bentonite were thoroughly mixed and moistened to contain about 6% of water. The mixture was then tamped into bars 12 inches long, 2 inches wide and ½ inch thick. These bars were fired in the kiln at cone 16 (2650° F.). A bar made in this way was supported upon knife edges 11 inches apart and loaded in the middle and heated over a period of 48 hours to cone 16 with increasing weights at successive heatings. The weight required to break the bar when applied in this way and at the temperature of cone 16 was found to be 90 pounds.

Similar bars were made in a similar way with a mixture of andalusite and alpha and beta alumina as specified in Patent No. 1,942,879, and when tested in the same manner as described above, broke at 10 pounds to 22½ pounds load, depending somewhat upon the fineness of grinding, etc. Similar bars made with andalusite and alpha alumina, but without beta alumina broke under the same test at no load.

Other bars were made of 89% silicon carbide, 10% ball clay and 1% bentonite as binder, and when tested in the same way as described above, were broken by a weight of 60 pounds.

It will be seen that the mixture mentioned above of silicon carbide with alpha and beta alumina was stronger than any of the other mixtures tested. The bar containing 89% of silicon carbide was the next strongest, but refractories containing such a high percentage of silicon carbide are undesirable for many purposes because of their oxidation and tendency to swell at high temperatures. With the relatively small amounts of silicon carbide, this tendency is substantially overcome.

Other tests were made with varying amounts of silicon carbide. It was found that the effectiveness of the silicon carbide varies somewhat with the fineness of the material and that particles as large as 28 mesh are substantially useless from the standpoint of combining with the other materials, but act principally as inert filler. It was found that the strongest bodies were made with a percetage of silicon carbide ranging from about 12% to 18%, depending somewhat upon the fineness of the grinding. Smaller amounts had decreasing effects, and amounts greater than 18% were weaker, and increasing the amount above a percentage within the indicated range, depending upon the degree of fineness, resulted in a rapid decrease in the strength. Mixtures containing from about 40% to 60% of silicon carbide resulted in bars which broke with a weight of about 10 pounds, while the strength increased as the amount of silicon carbide was decreased from 40% to the strongest point or increased from 60% to make a more nearly pure silicon carbide body.

It has, of course, been known that bodies having fairly high strength at high temperatures could be made from material consisting principally of bonded silicon carbide particles. It also has been known that the increase of clay and similar materials mixed with the silicon carbide rapidly reduced the strength of the refractory. The discovery upon which the present application is based is that a body even stronger than the usual silicon carbide refractories can be produced by a mixture of 12% to 18% of silicon carbide with aluminous material.

While the tests referred to above were made at a temperature of 16 cone (2650° F.) similar tests have been made with similarly produced bars at temperatures up to cone 32 (3050° F.), and similar relative strengths have been found at this higher temperature as well as at intermediate points.

The particular test described above is a standard test which applicant has been using for many years to test refractory materials where strength is required. While the particular test is directed to the amount of sag and/or the weight under which the bar breaks at a high temperature, it has been found that the resistance of the refractory to deformation by compression or other stresses follows its resistance to breaking in the manner described sufficiently closely for most practical purposes. A material which is strong in accordance with the test outlined is very suitable for saggers or other refractory constructions which must have considerable strength at high temperatures.

The refractory described above is so strong that for many purposes it retains ample strength even when considerably diluted, that is, grog or other coarse particles which do not enter into the fused combination of materials may be employed for considerable proportions of the body. With such mixtures, the strength of the article for a given size is reduced since the amount of the strong material in any given cross-section is reduced, but as indicated, the strength remains ample for many purposes and, therefore, such filler may be employed where it is desirable for purposes of economy.

A somewhat similar effect may be produced by voids, and in addition the presence of numerous voids in the material operates to increase the insulating quality of the product. By producing voids in the product in any well known manner, it is possible to produce fire brick for lining furnaces and products for other purposes where insulation is highly desirable and at the same time considerable strength is required. As will be readily understood, an article can be produced in this way which is both light in weight and has high insulating quality and at the same time is stronger than ordinary refractories of the same size.

Good results may be obtained with varying amounts of silicon carbide and with different substitutions for the clay for binding purposes. Preferably at least a major portion of the material is of the silicon carbide-alumina mixture and preferably above 85% is of this mixture. As indicated above, the proportion of silicon carbide to alumina in the mixture gives best results when approaching the proportion of 1 of silicon carbide to approximately 5 of alumina as in the example given, but marked benefits from the mixture of these materials may be obtained with proportions of anywhere from 11 to 29 parts of silicon carbide to 100 parts of alumina.

A certain amount of beta alumina along with the alpha alumina as disclosed in said Patent No. 1,942,879 is found to be beneficial, but it may be found more advantageous, particularly from an economic standpoint, to employ a mineralizer such as described in the co-pending application No. 337,358 of Milton W. Caton, for "Refractory material," filed May 27, 1940. While the mineralizer disclosed in said co-pending application is useful with the combination herein claimed, the use of the mineralizer other than B alumina with this combination is not claimed in this application because it is covered by the said co-pending application.

What I claim is:

1. A refractory having high strength at temperatures as high as 2650° F. and formed by firing together a batch, the major portion of which consists of a mixture of silicon carbide and alumina, ground to 80 mesh and finer, the silicon carbide being present in a proportion of from 11 to 29 parts to 100 parts of the alumina in the said mixture.

2. A refractory in accordance with claim 1, and containing numerous small voids constituting a light insulating refractory.

3. A refractory having high strength at high temperatures and formed by firing together a batch, 85% of which consists of a mixture of silicon carbide and alumina, ground to 80 mesh and finer, the silicon carbide being present in a proportion of from 11 to 29 parts to 100 parts of the alumina in the said mixture.

4. A refractory having high strength at temperatures from about cone 16 to cone 32 consisting of a fired batch containing not over 15% bonding material and the rest substantially all of a mixture of silicon carbide and alumina, ground to 80 mesh and finer, the proportions of these materials approximating 1 part of silicon carbide to 5 parts of alumina.

5. A refractory having high strength at high temperatures and comprising relatively inert filler with a bonding material consisting of a fired batch, the greater portion of which is made up of fine ground silicon carbide and fine ground aluminous materials in a proportion approximating 1 part of the silicon carbide to 5 parts of the aluminous material.

FRANK H. RIDDLE.